S. WESTER.
COMBINED HAMMOCK AND KNAPSACK.
APPLICATION FILED FEB. 24, 1920.
1,380,167.
Patented May 31, 1921.
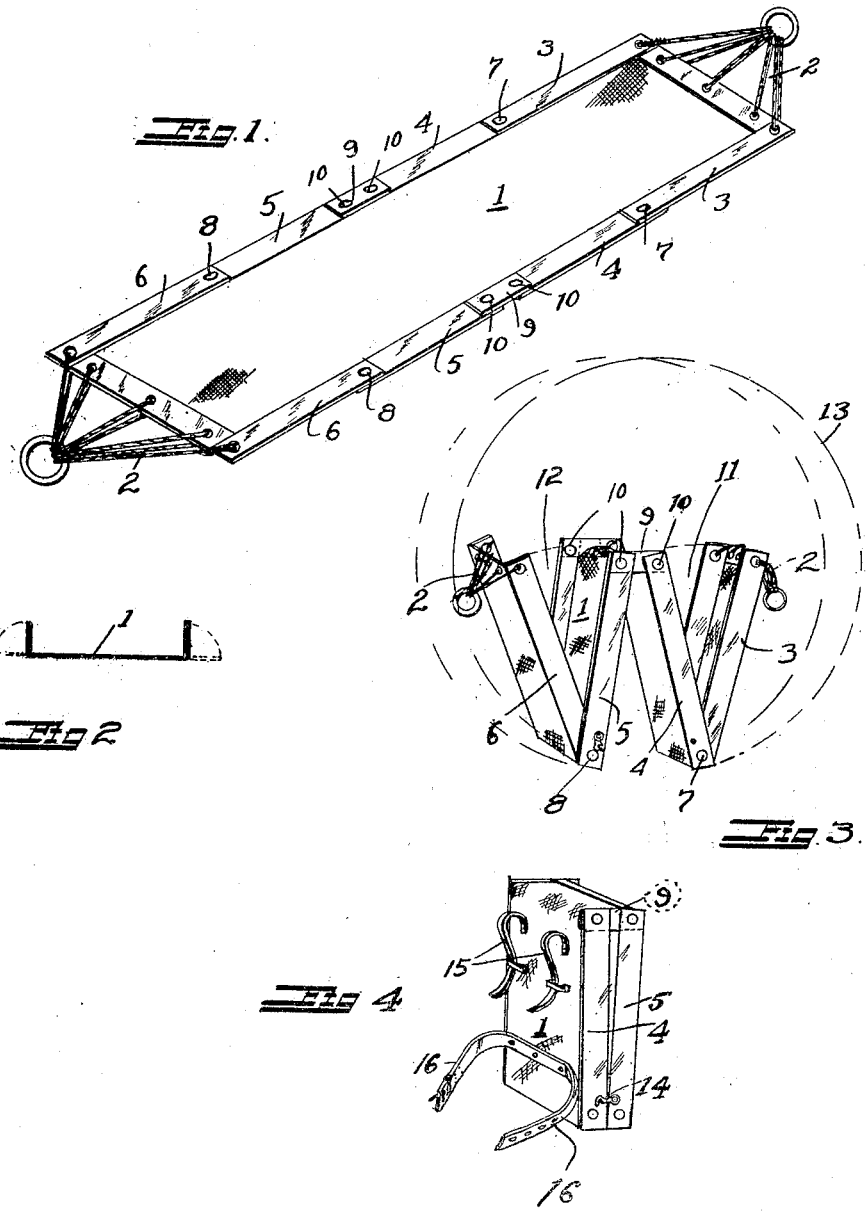
INVENTOR
Svante Wester.
BY Wm S. Bates
ATTORNEY

UNITED STATES PATENT OFFICE.

SVANTE WESTER, OF SAN FRANCISCO, CALIFORNIA.

COMBINED HAMMOCK AND KNAPSACK.

1,380,167. Specification of Letters Patent. Patented May 31, 1921.

Application filed February 24, 1920. Serial No. 360,612.

*To all whom it may concern:*

Be it known that I, SVANTE WESTER, of San Francisco, California, have invented certain new and useful Improvements in Combined Hammocks and Knapsacks, whereof the following is a specification.

This invention relates to an improvement in combined hammock and knapsack. The object is to produce an article which when unfolded may be used as a hammock, and may be folded into a knapsack, in which various articles may be carried and protected.

In carrying out the invention I make a hammock body of canvas or other suitable fabric. This I provide with a border, or edging of some stiffer material. I have found leather to be suitable for this purpose. I divide the article thus produced, into sections, longitudinally, preferably, four in number, and connect these sections by pivotal joints. Thus the two end sections may be folded over, and, with the intermediate sections, form pockets into which articles may be packed. These pockets are then folded over one another, preferably with the outer sections inside, and secured in such position. The whole may then, by suitable straps, be fastened upon the back of the owner.

In the accompanying one sheet of drawing I have fully illustrated a device containing my invention.

Figure 1 is a perspective view of the hammock, stretched out, ready to hang.

Fig. 2 is a cross-section of the same, showing, in dotted lines, how the stiffened sides may be turned up preparatory to folding the device into knapsack form.

Fig. 3 is the knapsack, partly folded for packing, shown in perspective.

Fig. 4 is the knapsack, completely folded, ready to put on.

In these figures:—The body of the hammock, 1, may be made of any suitable material used for that purpose, such as canvas. At its ends the body 1 is provided with the suspenders, 2, consisting usually of cords and rings as shown.

The body 1, is connected, at its edges, to the strips 3, 4, 5, 6, made of some stiff but flexible material, such as leather. When the device is in hammock form, these binding strips are flattened down into the plane of the body 1, as shown in Fig. 2, by dotted lines. The strips 3 and 4 are connected by rivets 7, and the strips, 5 and 6, are connected by rivets 8, which rivets constitute pivotal points, or hinges, as will presently appear. The strips 4 are connected to the strips 5 by short links 9, riveted to them by the rivets 10, there being sufficient clearance between the proximate ends of the link-coupled sections 4 and 5, as shown in Fig. 3, to permit turning on their pivots when the frame is folded.

When it is desired to fold the device into knapsack form, the edgings are first turned up at right angles to body 1, as shown in Fig. 2. The four sections are then folded upon their respective pivot points 7, 8, 10, into the form shown in Fig. 3, when blankets, clothing and other small articles may be packed into the spaces between the respective sides, 3, 4, and 5, 6, and those sides brought together as indicated by the dotted curves in Fig. 3, and the two bags, thus formed, folded on their pivotal points 10, as indicated by the long dotted line 13, in Fig. 3. This brings the device into the form shown in Fig. 4. The sections are then secured by the hooks and eyes 14, and may then be stored, or secured on the wearer's back by the shoulder straps 15 and the body strap 16.

It will be understood that the body portion 1, of canvas or other suitable material, is of sufficient fullness to give a slack which will permit folding of the side members or edgings, and since the end pieces to which the supporting ropes 2 are attached are not connected rigidly to the side pieces, but are independent thereof, no interference with the turning up of the edgings or side pieces to position for folding occurs.

I claim:—

1. A hammock body in combination with an edging of a stiffer material, said material divided, on each side, into four longitudinal sections, the outer sections pivotally connected to the next adjacent sections and adapted, when turned at right angles to the body of the hammock, to swing upon said pivotal points to form two pockets, said pockets connected by links and pivots and adapted to swing thereupon in knapsack form.

2. In a hammock, the combination of a body portion of flexible material; relatively rigid sections secured to the side edges of said body portion; and connections between said sections to provide continuous, relatively rigid side bars for said body portion when in one position and permit them to be folded and the hammock collapsed when in another position.

3. In a hammock, the combination of a body portion of flexible material; relatively rigid sections secured to the side edges of said body portion; and pivoted connections between said sections to provide continuous, relatively rigid side bars for said body portion when in one position and permit them to be folded and the hammock collapsed when in another position.

4. In a hammock, the combination of a body portion of flexible material; relatively rigid sections having overlapped ends secured to the side edges of said body portion; and pivotal connections between the overlapped ends of said sections to provide continuous, rigid side bars for said body portion when in extended position and permit them to be folded and the hammock collapsed when in another position.

5. In a hammock, the combination of a body portion of flexible material; relatively rigid sections secured to the side edges of said body portion, said sections being shiftable from a flat to a vertical position and pivotal connections between the lapped ends of said sections which maintain them in rigid continuous formation when flat and permit them to be folded together when turned to their vertical position.

6. In a hammock, the combination of a body portion of flexible material; relatively rigid sections secured to the side edges of said body portion, said sections being shiftable from a flat to a vertical position, pivotal connections between the lapped ends of said sections which maintain them in rigid continuous formation when flat and permit them to be folded together when turned to their vertical position, and means for fastening said sections in folded position.

SVANTE WESTER.